(12) United States Patent
Rauleder et al.

(10) Patent No.: US 6,680,038 B2
(45) Date of Patent: Jan. 20, 2004

(54) PROCESS FOR THE SEPARATION OF CHLOROSILANES FROM GAS STREAMS

(75) Inventors: Hartwig Rauleder, Rheinfelden (DE); Franz-Michael Bollenrath, Marl (DE); Harald Seiler, Marl (DE); Mieczyslaw Kuzma, Rheinfelden (DE); Christoph Koopmann, Essen (DE)

(73) Assignee: Degussa AG, Duesseldorf (DE)

( * ) Notice: Subject to any disclaimer, the term of this patent is extended or adjusted under 35 U.S.C. 154(b) by 581 days.

(21) Appl. No.: 09/749,520

(22) Filed: Dec. 28, 2000

(65) Prior Publication Data

US 2001/0046465 A1 Nov. 29, 2001

(30) Foreign Application Priority Data

Dec. 28, 1999 (DE) .......................................... 199 63 433

(51) Int. Cl.[7] ............................................ C01B 33/107
(52) U.S. Cl. ................... 423/240 R; 423/342
(58) Field of Search .................... 423/240 R, 245.1, 423/245.2, 481, 488, 342, 336

(56) References Cited

U.S. PATENT DOCUMENTS

| | | | |
|---|---|---|---|
| 4,454,104 A | 6/1984 | Griesshammer et al. | |
| 5,066,472 A | 11/1991 | Ruff et al. | |
| 5,182,095 A | 1/1993 | Ruff et al. | |
| 5,320,817 A | 6/1994 | Hardwick et al. | |
| 5,378,444 A | * 1/1995 | Akita et al. | 423/240 S |
| 5,961,695 A | * 10/1999 | Hasegawa et al. | 95/230 |
| 6,322,765 B1 | * 11/2001 | Muhlhofer et al. | 423/336 |

FOREIGN PATENT DOCUMENTS

| | | |
|---|---|---|
| EP | 0 089 183 | 9/1983 |
| EP | 0 216 292 | 4/1987 |
| EP | 0 532 857 | 3/1993 |

* cited by examiner

Primary Examiner—Ngoc-Yen Nguyen
(74) Attorney, Agent, or Firm—Oblon, Spivak, McClelland, Maier & Neustadt, P.C.

(57) ABSTRACT

Chlorosilanes are continuously removed from a gas stream in an apparatus in which the gas stream is treated in a first stage with water vapor in the gas phase, and in a second stage with a liquid, aqueous phase.

18 Claims, 3 Drawing Sheets

PROCESS FOR THE SEPARATION OF CHLOROSILANES FROM GAS STREAMS

BACKGROUND OF THE INVENTION

1. Field of the Invention

The present invention is a process for the separation of chlorosilanes from gas streams, in which chlorosilane containing gas streams are brought into contact with water vapor in a first stage and with liquid water in a second stage.

2. Discussion of the Background

Chlorosilanes and hydrogen are formed in the reaction of silicon with hydrogen chloride. This reaction is termed the direct synthesis of chlorosilanes. By cooling the reaction gases of this reaction, a liquid chlorosilane mixture may be condensed. However, even at condensation temperatures far below 0° C., chlorosilanes which are liquid at room temperature, i.e., trichlorosilane (silicochloroform) and tetrachlorosilane (silicon tetrachloride), still have a considerable vapor pressure, and therefore significant amounts of these chlorosilanes may remain in the hydrogen-rich waste gas. In addition, small amounts of chlorosilanes which are gaseous at room temperature, i.e., dichlorosilane and optionally monochlorosilane, are also formed in the reaction, and may be present in the waste gas. All of these chlorosilanes must be separated from the hydrogen-rich waste gas before the waste gas may be burned, with or without energy recovery, or used in some other way.

EP 0 089 783 A2 describes a process for the treatment of liquid, chlorosilane-containing waste products or byproducts from the preparation of silicones by hydrolysis of organochlorosilanes in an aqueous medium. In this process, the average Si—Cl functionality of the waste products or byproducts is at least 2.8, and it is intended that the hydrolyzate be recovered in the form of a granulated gel. However, it has been shown that such gas-scrubbing processes simply transform a waste gas problem into a waste water problem, because gelatinous oligomers which are extremely difficult to filter remain in the washing water.

EP 0 532 857 A1 describes a process for steam hydrolysis of the residues produced by a chlorosilane distillation process, which in its continuous embodiment is carried out at an initial temperature of at most 160° C. and at a final temperature of at least 170° C.

There is therefore a need for a continuous process in which chlorosilanes can be removed simply and reliably from gas streams by hydrolysis, and the hydrolysis product may be produced in a form which can be easily disposed of without problems. Preferably, such a process should largely avoid the formation of deposits and blockages in the hydrolysis apparatus so that long operating times are possible. Further objects of the invention are obvious from the following description.

SUMMARY OF THE INVENTION

It has been found that chlorosilanes may be continuously and effectively removed from gas streams if the gas streams are treated in two stages, first, in the gas phase with water vapor, for example steam, and second, with a liquid, aqueous phase.

DETAILED DESCRIPTION OF THE INVENTION

Figure 1:
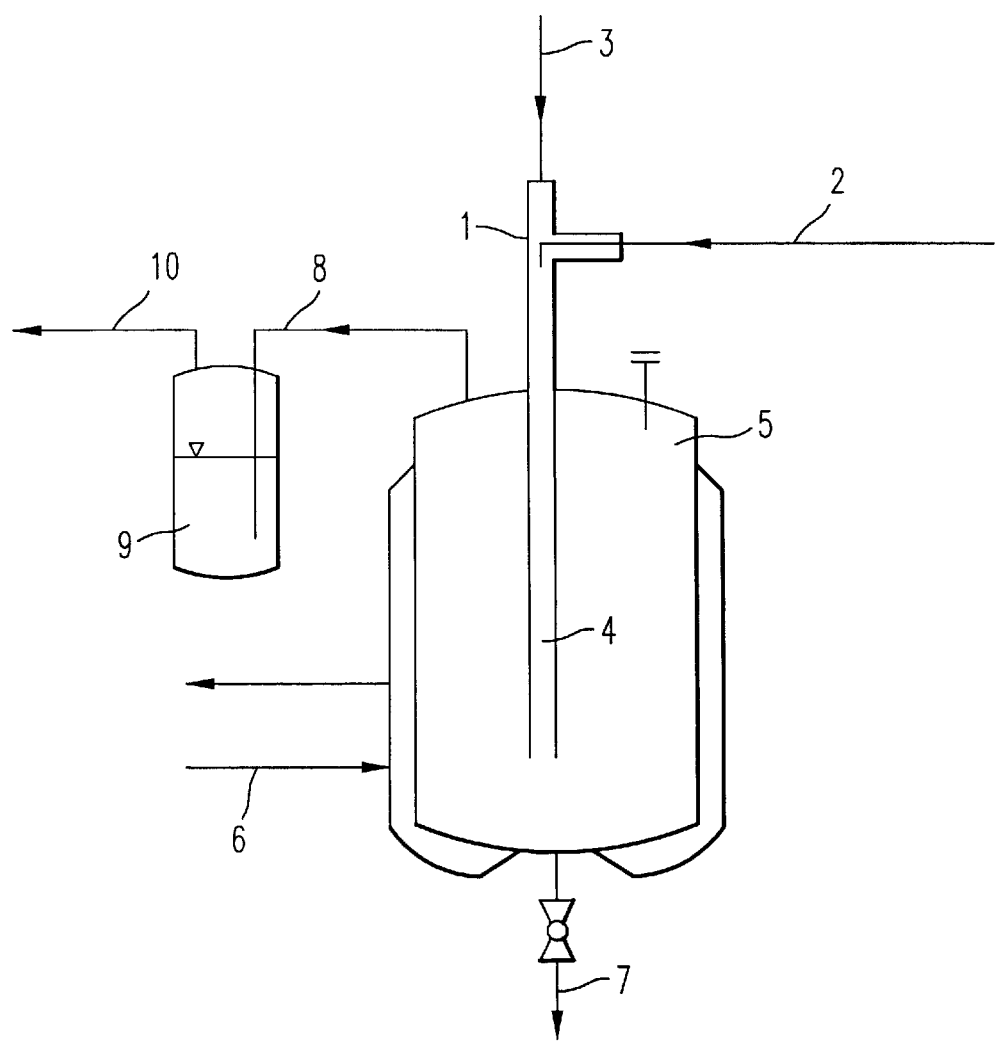
FIG. 1, is a schematic diagram of an apparatus for carrying out the process of the present invention in its first embodiment.

Chlorosilanes are obtained quantitatively in the form of readily separable solid hydrolysis products by treating chlorosilane containing gas streams with steam in the gas phase, then treating the gas stream with a liquid, aqueous phase. It is assumed that in the gas phase, i.e. in the first stage of the process, hydrolysis of Si—Cl bonds commences with the initial formation of presumably gaseous substances, which are termed primary hydrolysis products. The assumption that hydrolysis takes place in the gas phase is supported by the generally known fact that chlorosilanes are decomposed by atmospheric moisture to give $SiO_2$ and HCl. The assumption that the primary hydrolysis products are gaseous is supported by the fact that it is not possible to separate them as particles, e.g. in cyclones. Even in the so-called precoating process, in which an additional layer of hydrolysis products are deposited on auxiliary materials, (e.g., limestone, kieselguhr or active carbon) before filtration, primary hydrolysis products cannot be successfully separated from the gaseous treatment mixture.

In the second stage of the process, the gas stream is treated with a liquid, aqueous phase, and the primary hydrolysis products produced in the gas phase may act as condensation nuclei. A heterogeneous condensate is produced, consisting of predominantly solid hydrolysis products of the chlorosilanes and of the water resulting from condensation of the steam and/or water supplied from other sources. The liquid, aqueous phase contains hydrogen chloride as well as dissolved monomeric, oligomeric or polymeric hydrolysis products (presumably monomeric, oligomeric or polymeric silicic acids). The solid or dissolved hydrolysis products are termed secondary hydrolysis products.

The present process is particularly suited for the removal of chlorosilanes from gas streams produced by the direct process for the preparation of chlorosilanes, from silicon (ferrosilicon) and hydrogen chloride, in which chlorosilanes are condensed at low temperatures. Generally, such gas streams contain 3 to 60% by weight, preferably 5 to 15% by weight, of chlorosilanes, which consist mainly of trichlorosilane and, to a smaller extent, of tetrachlorosilane and dichlorosilane and optionally traces of monochlorosilane. A considerable proportion of such gas streams consists of hydrogen (hydrogen is the predominant component on a molar basis) with minor, but still considerable, proportions of hydrogen chloride and of other constituents, e.g. hydrogen sulfide. In general up to 40% by weight, and in particular 0.5 to 10% by weight, of the gas stream is hydrogen chloride and other constituents. After low-temperature condensation, the gas streams generally have a temperature of −50 to −80° C. If desired, the cold gas stream may be preheated to a temperature of up to 200° C. or more, before being treated by the chlorosilane separation process of the present invention.

First Embodiment

In the first embodiment of the process of the present invention, the gas stream containing chlorosilanes is first treated at a temperature of at least 125° C., preferably 130 to 250° C., with independently supplied steam. The first embodiment differs in this respect from the second embodiment, described below. Preferably, the gas stream is mixed with superheated steam, such that the mixed gas/steam stream has a temperature of at least 125° C., preferably 130 to 250° C. For a given steam temperature, the amount of steam employed may be lower if the gas stream is preheated indirectly to a temperature of up to 200° C., e.g. to 40 to 200° C.

The steam serves as both a source of heat, as well as a reactant in the hydrolysis of the chlorosilanes. In the course of the hydrolysis reaction, hydrogen chloride is produced. Si—H bonds, however, remain unaffected. As discussed above, the chlorosilanes produced by hydrolysis with steam in the first stage of the process afford a primary, presumably gaseous hydrolysis product. For the hydrolysis of the chlorosilanes, a minimum amount of steam is needed, namely 1 mol of $H_2O$ per equivalent of chlorine atoms. An excess of steam of from 1.2 to 300 times, in particular of from 8 times to 250 times, the stoichiometric amount is advantageous in order that the hydrolysis, as well as the separation of the silicon-containing hydrolysis products, be rapid and complete. This amount of steam is also preferred because adequate amounts of a liquid, aqueous phase are formed in the subsequent condensation in the second stage of the process. In the course of the second stage of the process, the primary hydrolysis products oligomerize or polymerize further to give readily separable secondary hydrolysis products. If steam of 140 to 260° C., and at a correspond pressure of approximately 4 to 50 bar, is used in an amount of 5 to 500 times, preferably 10 to 60 times the amount of chlorosilanes, by weight, there is generally both sufficient heating capacity to establish a temperature of >125° C., even in the case of nonpreheated gas streams, and for complete conversion of the chlorosilanes into readily separable secondary hydrolysis products. These secondary hydrolysis products are in the form of a heterogeneous condensate, together with amounts of water which can still economically be evaporated in order to effect separation of the secondary hydrolysis products.

The steam treatment times in the first stage can be very short, and may be less than 1 sec, for example 0.0005 to 1.5 sec and preferably 0.001 to 1.0 sec. These short treatment times correspond to high flow rates, for example from 5 to 30 m/sec. The treatment times for the treatment with the aqueous phase in the second stage are considerably longer. In general, the treatment time for the two stages together takes up between 3 and 300 sec. The flow rates in the second stage are considerably lower than in the first stage and are, for example, only 0.001 to 0.1 times, preferably 0.002 to 0.01 times, the flow rate of the first stage. Depending on the volume of the cooling container in which the second stage of the process proceeds, described below, the residence time of the components of the gas stream during this stage is correspondingly longer.

In the first embodiment of the process according to the invention, the treatment of the chlorosilane-containing gas stream with steam in the first stage advantageously takes place in a tubular reactor. The gas stream is preferably introduced into the interior of a steam stream in the direction of gas flow, thereby reducing the formation of fixed deposits on the tube wall.

In the second stage of the process, the gas stream emerges from the steam treatment zone with approximately the same temperature established upon mixing the chlorosilane-containing gas stream with steam in the steam treatment zone. The gas stream is then introduced into a cooling container where it is cooled to a temperature below the dew point. As a result, the steam condenses, and a heterogeneous condensate consisting of a liquid aqueous phase and the solid or dissolved secondary hydrolysis products, separates. The liquid aqueous phase is strongly acidic because of the hydrogen chloride formed by hydrolysis of the chlorosilanes, contained in the gas stream. The remaining gas stream is in contact, and thereby treated with, the resulting acidic liquid aqueous phase.

Heat is extracted from the gas stream and the heterogeneous condensate in the cooling container, by means of a cooling agent which flows through a cooling jacket, through external or internal cooling coils, or similar devices. The cooling agent is preferably water at a temperature of from 10 to 90° C.

An important feature of the cooling container is that it has perpendicular or approximately perpendicular walls. By perpendicular, we mean that the walls form angles of −30 to +30°, advantageously from −15° to +15° and in particular of approximately 0°, with the vertical. Perpendicular or approximately perpendicular walls of this type assist the heterogeneous condensates in falling from the walls to the bottom of the cooling container.

In a preferred embodiment of the first embodiment of the present invention, the mixture of a chlorosilane-containing gas stream and steam having a temperature of >125° C. is passed from above a vertically oriented, cylindrical cooling container through a vertical oriented reaction tube, which projects centrally from above the cooling container into the lower third of the cooling container. The cooling container is equipped with a cooling jacket through which cooling water flows. The cooling container may be subdivided into two cooling zones, a smaller upper cooling zone which is cooler than the larger, lower cooling zone. More of the steam is separated in the warmer lower zone than in the cooler upper zone. Owing to this subdivision of the cooling container, less cooling water is needed, which facilitates the later removal of the secondary hydrolysis product from the aqueous phase of the heterogeneous condensate. Alternatively, the gas stream may be treated with steam in a tubular reactor completely outside the cooling container. The gas stream may then be directed tangentially into the cooling container, which then has only one cooling zone.

In the cooling container, the steam condenses with the formation of droplets, which as mentioned, possibly nucleate on the primary hydrolysis products. These droplets are transported without further treatment and precipitate as a film on the cooled surfaces of the cooler areas of the cooling zone. The driving force for the transport of the droplets is the flow caused by the decrease in volume of the gas stream resulting from condensation of the steam (Stefan flow).

If the internal walls of the cooling container and the surfaces of all internal parts, such as cooling coils, are smooth, i.e. have no macroscopic unevenness, cracks, grooves, lugs or other projections, the heterogeneous condensate slides particularly easily from the vertical or approximately vertical surfaces, together with the secondary hydrolysis product formed, and collects at the bottom of the cooling container in the form of an aqueous phase, on which a very water-rich, finely divided secondary hydrolysis product floats. Smooth inner walls or surfaces are all the more important the more the slope of the inner walls or surfaces is removed from 0° from the vertical. The nature of the materials from the which the cooling container and other internal parts, etc., are constructed is less important than the condition of their surfaces. However, hydrophilic materials, such as glass, enamel and smoothly polished hydrochloric acid-resistant steel, are preferred to more hydrophobic materials, which may include most polymers, such as, for example, polytetrafluoroethylene. Polymers moreover have poorer heat transfer properties.

As mentioned above, the heterogeneous condensate at the bottom of the cooling container consists of water, on which a very water-rich, solid secondary hydrolysis product of the chlorosilanes floats. In general, the solid hydrolysis product consists to 95.0 to 99.5% by weight of included aqueous phase. The solid component is very finely divided or gelatinous and, just as in the previously discussed gas-scrubbing processes of the prior art, can only be separated from the water with difficulty. Since the amount of water employed in the process of the present invention is, however, comparatively small, it can be removed in an economical manner by evaporation, thereby forming a nearly anhydrous, finely divided silica residue of low density, which can be disposed of at low cost. Hydrogen chloride, which was a component of the chlorosilane-containing gas stream, and formed partly by hydrolysis of the chlorosilanes, remains dissolved in the aqueous phase. The aqueous phase furthermore contains dissolved hydrolysis products, presumably silicic acid oligomers or polymers.

FIG. 1 is a schematic diagram of an apparatus for carrying out the first embodiment of the process according to the present invention. At the mixing site 1, the chlorosilane-containing gas stream 2 and steam stream 3 are introduced into the tubular reactor 4, in which the treatment of the gas stream with steam takes place, with the formation of primary hydrolysis products. The tubular reactor 4 dips into the cooling container 5, which has a cooling jacket through which cooling agent 6 flows. Upon entry of the gas stream into the cooling container, the flow rate of the gas stream greatly decreases. Steam condenses on the inner walls of the cooling container, and the condensate, together with secondary hydrolysis products, flows in the form of a film to the bottom of the cooling container, from which it is removed continuously or periodically as a heterogeneous condensate 7. The residual gas 8 passes through the scrubber 9, which can be charged, for example, with sodium hydroxide solution in order to remove hydrogen chloride and to monitor the content of silicon-containing compounds. After passing through the scrubber, the residual gas leaves the system as waste gas 10. Generally, the waste gas is free of hydrogen chloride and of silicon compounds and can be burned or used in some other way. The heterogeneous condensate 7 can, for example, be dried at 100 to 160° C. in air in a paddle dryer (not shown in the figure) and the residue can be disposed of.

Second Embodiment

In a second embodiment of the process of the present invention, another aqueous liquid is employed as the liquid, aqueous phase for the treatment of the gas stream instead of the condensate derived from steam. In this process, the optionally preheated gas stream generally has a temperature of up to 200° C., for example from 5 to 200° C., preferably from 30 to 150° C., and the temperature of the other aqueous liquid is generally 10 to 90° C., in particular 20 to 50° C. Water vapor is present in the gas phase above the other aqueous liquid at a partial pressure of 12 to 700 mbar, depending on the temperature of this other aqueous liquid, and serves as steam for the first stage of the treatment of the gas stream, according to the present invention. This first stage treatment is followed by the second stage of the treatment, in which the gas stream is treated with the other aqueous liquid.

The other aqueous liquid can be water, e.g. tap water, steam condensate or deionized water. Alternatively, it is possible to employ, for example, an aqueous basic liquid, such as milk of lime, sodium hydroxide solution or ammonia solution. If an aqueous basic liquid is used, the hydrogen chloride contained in the gas stream or formed by hydrolysis is simultaneously neutralized as the chlorosilanes are hydrolyzed. In addition, any Si—H bonds still present may react with the base to form Si—O groups (i.e., silanolates) and $H_2$.

Generally, the duration of the first and second stages of the treatment lasts 5 to 120 sec., in particular 10 to 40 sec.

The other aspects of the equipment, process conditions, and the properties and the treatment of the heterogeneous condensate are as described above for the first embodiment of the process of the present invention.

Figure 2:
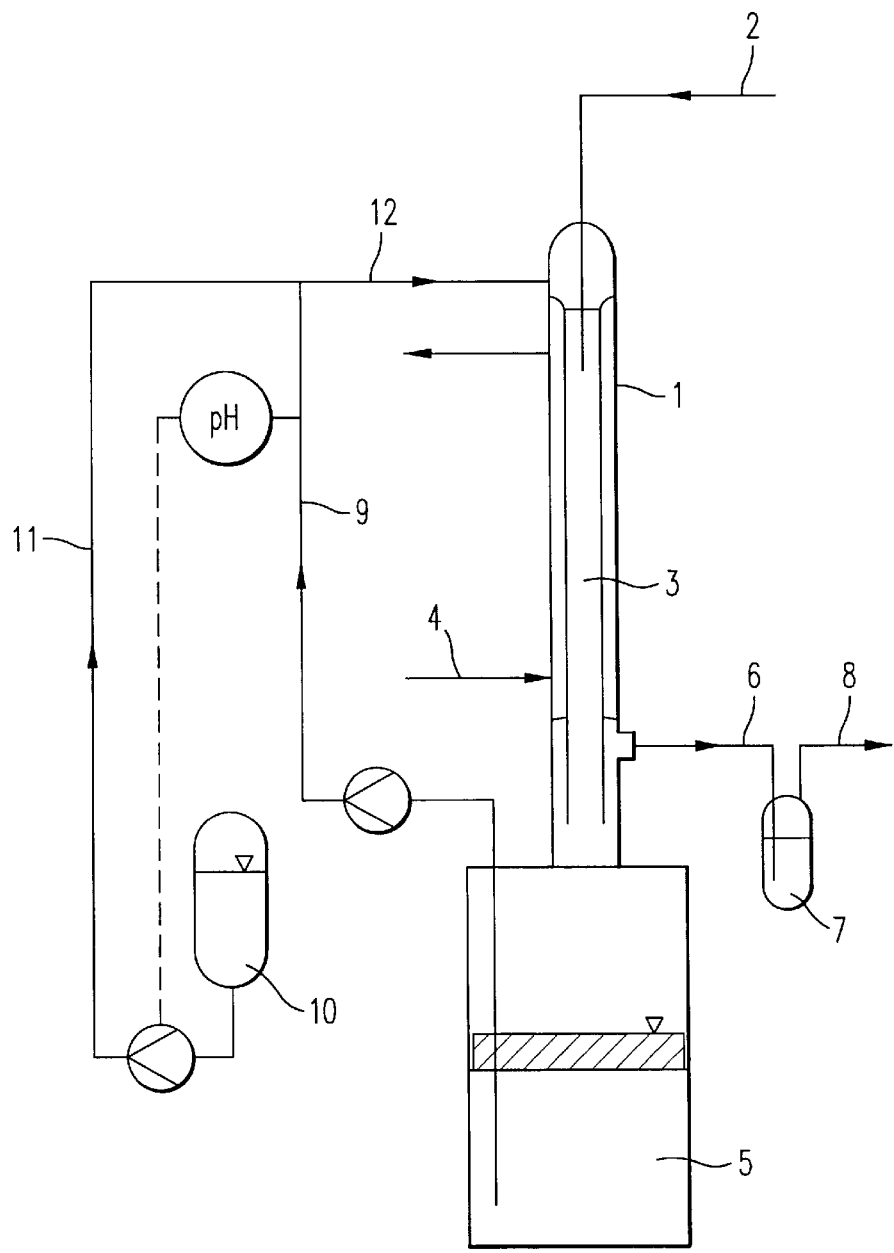
FIG. 2, is a schematic diagram of an apparatus for carrying out the process of the present invention in its second embodiment.

FIG. 2 is a schematic diagram of an apparatus for carrying out the second embodiment of the process according to the present invention. At the mixing site 11, the chlorosilane-containing gas stream 12 is introduced into the tubular reactor 13, whose inner walls are wetted with "another aqueous liquid" 22, such as tap water or deionized water. The walls of the tubular reactor 13 are cooled by the cooling agent 14. Upon entry into the tubular reactor 13, the velocity of the gas stream 12 decreases greatly. The treatment of the gas stream 12 with the steam originating from the other aqueous liquid 22 takes place in the tubular reactor 13, with formation of hydrogen chloride and primary hydrolysis products. The formation of secondary hydrolysis products takes place in the other aqueous liquid 22 which wets the wall of the equipment, resulting in a suspension. This suspension is separated from the purified gas stream 16 in the collecting container 15 and removed continuously or periodically as hydrolyzate suspension 15. The purified gas stream 16 then passes through the scrubber 17 which can be charged, for example with water, and leaves the system as waste gas 18. Scrubber 17 may also be used for monitoring the content of residual silicon-containing compounds in the gas stream. To re-use the other aqueous liquid 22, the suspension can be recycled as a stream 19 until the concentration of the secondary hydrolysis products has reached a predetermined value. In addition, the circulation stream 19 can be treated to neutralize the hydrogen chloride formed by the hydrolysis of chlorosilanes with an aqueous alkaline liquid 21, which can be removed, for example, from the reservoir 20. If the other aqueous liquid 22 or the circulation stream 19 is rendered alkaline in this manner, largely soluble silicon compounds result, thereby markedly reducing the tendency for deposits to form on tubular reactor 13 and collecting container 15.

Third Embodiment

The third embodiment of the process of the present invention is a combination of the two first embodiments. Thus, steam is employed for the treatment of the gas stream in the gas phase in the first stage of the treatment, and additionally another aqueous liquid not exclusively produced by condensation of the steam is employed for the second stage of treatment of the gas stream. The gas stream is thus treated with both this "other aqueous liquid" and with the condensed steam. The "other aqueous liquid" may be water or a basic, aqueous liquid. Alternatively, the heterogeneous condensate or its aqueous phase may be used by recirculating a part of the liquid which collects at the bottom of the cooling container. It is possible, for example, to pass the "other aqueous liquid" or the aqueous phase of the heterogeneous condensate through a ring line in the uppermost part of the cooling container 5 of FIG. 1 on its cylindrical inner wall. This promotes the separation of the heterogeneous condensate as a result of cooling. In turn, the waste gas from the cooling vessel is free of silicon containing compounds and can be burned or used in some other way.

Generally, the first and second stages of the treatment lasts 3 to 120 sec., in particular 10 to 40 sec.

The other aspects of the equipment, process conditions, and the properties and the treatment of the heterogeneous condensate are as described above for the first embodiment of the process of the present invention.

Figure 3:
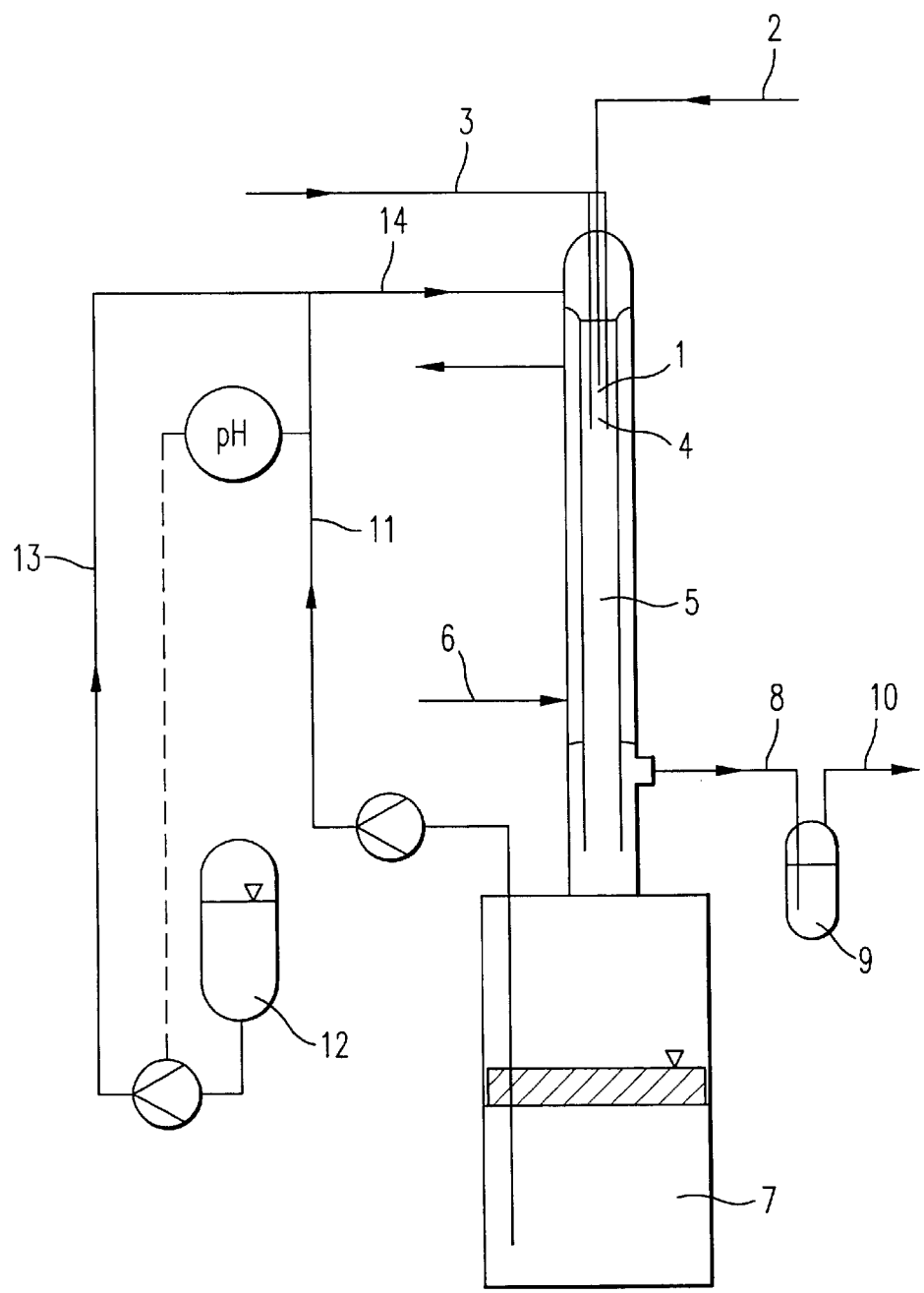
FIG. 3, is a schematic diagram of an apparatus for carrying out the process of the present invention in its third embodiment.

FIG. 3 is a schematic diagram of an apparatus for carrying out the third embodiment of the process of the present invention. At the mixing site 31, the chlorosilane-containing gas stream 32 and steam 33 are introduced into the tubular reactor 34, where the treatment of the chlorosilane-containing gas stream 32 with steam 33 takes place with formation of primary hydrolysis products. The tubular reactor 34 dips into the cooling container 35, whose inner walls are wetted with the "other aqueous liquid" 44. In addition, the walls of tubular reactor 34 can be cooled by means of a cooling agent 36. The flow rate of gas streams 32 and 33 greatly decreases upon entry into the cooling container 35. Steam 33 condenses in the interior of the cooling container 35, and the condensate is transported to the wetted equipment wall together with secondary hydrolysis products by means of a Stefan flow. The resulting suspension of secondary hydrolysis products, condensed steam 33 and other aqueous liquid 44 runs off the walls, is collected in the collecting container 37 and removed continuously or periodically. The purified residual gas 38 then passes through the scrubber 39, which may be charged, for example, with water, and leaves the system as waste gas 40. In addition, scrubber 39 may be used to monitoring the residual content of silicon-containing compounds in the gas stream. In the third embodiment of the process of the present invention, it is generally not necessary to remove hydrogen chloride from the waste gas 40. In order to minimize use of the "other aqueous liquid" 44, the suspension may be recycled as stream 41 until the concentration of the secondary hydrolysis products has reached a predetermined value. In addition, the circulation stream 41 may be treated with an aqueous alkaline liquid 43, for example, from the reservoir 42, to neutralize the hydrogen chloride formed by hydrolysis of chlorosilanes. If the "other aqueous liquid" 44 or the circulation stream 41 is rendered alkaline in this manner, largely soluble silicon compounds result, thereby markedly reducing the tendency deposits to form on cooling container 35 and collecting container 37.

Having generally described this invention, a further understanding can be obtained by reference to certain specific examples which are provided herein for purposes of illustration only, and are not intended to be limiting unless otherwise specified.

EXAMPLES 1 TO 3

A glass apparatus according to FIG. 1 was used. The tubular reactor 4 had a length of 2.0 cm and an inner diameter of 1.0 cm. The cylindrical cooling container 5 had an inner diameter of 140 cm and a volume of 4.5 $dm^3$. The temperature of the cooling water was 20° C., and had a flow rate of 12 l/min. The other experimental conditions were as shown in Table 1. The condensate containing the dissolved or suspended secondary hydrolyzate was evaporated and the silica which remained as a residue was dried at 150° C. and weighed. The results obtained are shown in Table 2.

TABLE 1

| | Waste gas steam 2 | | | | | | Tubular | Cooling | |
| | | Trichlorosilane | | Steam stream 3 | | | reactor 4 | vessel 5 | Mixing |
| Ex. No. | Water flow (g/h) | (g/h) | (% by weight) | Temperature (° C.) | Amount (g/h) | Quantitative ratio** | Residence time (sec) | Residence time (sec) | temp.* (° C.) |
| 1 | 9.0 | 9.9 | 52.4 | 160 | 548.2 | 55.2:1 | 0.01 | 213 | 129 |
| 2 | 9.0 | 9.9 | 52.4 | 220 | 750.0 | 75.8:1 | 0.01 | 213 | 154 |
| 3 | 18.0 | 9.9 | 35.5 | 220 | 657.5 | 66.4:1 | 0.005 | 107 | 152 |

*Treatment temperature; measured 3 mm above the entry of the steam stream
**Weight ratio of steam to trichlorosilane

TABLE 2

| | Silica (dried) | | | | |
| Ex. No. | Amount (g/h) | Water content (% by weight) | Waste gas 8 temperature | Silica in gas scrubber 9 (G/h) | Waste gas 10 amount (g/h) |
| 1 | 4.1 | 0 | 30 | 0.4 | 12.4 |
| 2 | 4.1 | 0 | 32 | 0.3 | 12.8 |
| 3 | 4.3 | 0 | 30 | 0.4 | 24.7 |

EXAMPLES 4 TO 6

The procedure corresponded to that of Examples 1 to 3, but using a tubular reactor having a length of 80 cm and an inner diameter of 1.0 cm and a cylindrical cooling vessel having an inner diameter of 80 cm and a volume of 3.0 $dm^3$. The other experimental conditions were as shown in Table 3 and the yields obtained are shown in Table 4.

TABLE 3

| | Waste gas steam 2 | | | Steam stream 3 | | | Tubular reactor 4 | Cooling vessel 5 | Mixing |
|---|---|---|---|---|---|---|---|---|---|
| | Water flow | Trichlorosilane | | | | | | | |
| Ex. No. | Water flow (g/h) | (g/h) | (% by weight) | Temperature (° C.) | Amount (g/h) | Quantitative ratio** | Residence time (sec) | Residence time (sec) | temp.* (° C.) |
| 4 | 18.0 | 9.9 | 35.5 | 220 | 642.0 | 64.8:1 | 0.5 | 84 | 155 |
| 5 | 13.5 | 9.9 | 42.3 | 220 | 468.9 | 47.2:1 | 0.6 | 108 | 151 |
| 6 | 9.0 | 9.9 | 52.4 | 220 | 562.9 | 56.7:1 | 0.9 | 162 | 155 |

*Treatment temperature; measured 3 mm above the entry of the steam stream
**Weight ratio of steam to trichlorosilane

TABLE 4

| | Silica (dried) | | | | |
|---|---|---|---|---|---|
| Ex. No. | Amount (g/h) | Water content (% by weight) | Waste gas 8 temperature (° C.) | Silica in gas scrubber 9 (g/h) | Waste gas 10 amount (g/h) |
| 4 | 8.1 | 47 | 25 | 1.0 | 23.0 |
| 5 | 7.7 | 46 | 25 | 0.9 | 17.3 |
| 6 | 6.9 | 40 | 25 | 0.9 | 11.5 |

TABLE 6

| | Silica (dried) | | | | |
|---|---|---|---|---|---|
| Ex. No. | Amount (g/h) | Water content (% by weight) | Waste gas 38 temperature (° C.) | Silica in gas scrubber 39 (g/h) | Waste gas 40 amount (g/h) |
| 7 | 6.6 | 38 | 30 | 0.8 | 12.4 |
| 8 | 6.8 | 38 | 30 | 0.3 | 16.9 |
| 9 | 7.2 | 38 | 30 | 0.2 | 24.7 |
| 10 | 7.7 | 31 | 30 | 0.4 | 12.4 |
| 11 | 3.7 | 28 | 40 | 0.4 | 12.4 |

EXAMPLES 7 TO 11

A glass apparatus according to FIG. 3 was used. The tubular reactor 34 had a length of 1.5 cm and an inner diameter of 0.6 cm. The cylindrical cooling vessel had an inner diameter of 3.5 cm and a volume of 0.67 dm$^3$. The temperature of the cooling water was 18° C., with a flow rate of 12 l/min. The "other aqueous liquid" used was deionized water, which was supplied at a pH of 12.5 in an amount of 70 to 100 l/h. The pH was adjusted by means of 10% sodium hydroxide solution. The other experimental conditions were as shown in Table 5. The suspension containing the secondary hydrolyzate was evaporated and the silica which remained as a residue was dried at 150° C. and weighed. The results obtained are shown in Table 6.

The experiments of Examples 1 to 11 show that chlorosilanes are removed virtually quantitatively. Even after 4 weeks' uninterrupted operation, the equipment showed virtually no coating on tubes, walls and other equipment parts, let alone blockages.

The priority document of the present application, German patent application 19963433.5 filed Dec. 28, 1999, is incorporated herein by reference.

Obviously, numerous modifications and variations of the present invention are possible in light of the above teachings. It is therefore to be understood that within the scope of the appended claims, the invention may be practiced otherwise than as specifically described herein.

TABLE 5

| | Waste gas steam 32 | | | Steam stream 33 | | | Tubular reactor 34 | Cooling vessel 35 | Mixing |
|---|---|---|---|---|---|---|---|---|---|
| | | Trichlorosilane | | | | | | | |
| Ex. No. | Water flow (g/h) | (g/h) | (% by weight) | Temperature (° C.) | Amount (g/h) | Quantitative ratio** | Residence time (sec) | Residence time (sec) | temp.* (° C.) |
| 7 | 9.0 | 9.2 | 58.5 | 220 | 468.9 | 35.7:1 | 0.001 | 20 | 165 |
| 8 | 13.5 | 9.9 | 42.3 | 220 | 138.9 | 14.1:1 | 0.005 | 19 | 138 |
| 9 | 18.0 | 10.7 | 37.3 | 220 | 468.9 | 43.7:1 | 0.001 | 11 | 155 |
| 10 | 9.0 | 12.3 | 57.8 | — | — | — | — | 20 | — |
| 11 | 18.0 | 6.3 | 25.9 | — | — | — | — | 11 | — |

*Treatment temperature; measured 3 mm above the entry of the steam stream
**Weight ratio of steam to trichlorosilane

What is claimed is:

1. A continuous process for removing chlorosilanes from a gas stream, comprising:

contacting a gas stream containing at least one chlorosilane with water vapor in the gas phase in a first stage, and contacting said gas stream with a liquid, aqueous phase in a second stage.

2. The process of claim 1 wherein said water vapor is steam.

3. The process of claim 1, wherein said gas stream comprises 3 to 60% by weight of at least one chlorosilane.

4. The process of claim 2, wherein said gas stream is heated to a temperature of at least 125° C. in said first stage with steam, and the liquid, aqueous phase of said second stage is a heterogeneous condensate of water and secondary hydrolysis products formed by cooling the gas stream below the dew point, or the aqueous phase of said heterogeneous condensate.

5. The process of claim 4, wherein the temperature of said first stage is 125 to 250° C.

6. The process of claim 4, wherein, in said first stage, said gas stream is introduced into the interior of a stream of said steam such that the direction of flow of said gas stream and the direction of flow of said stream of steam are the same.

7. The process of claim 4, wherein the weight ratio of said steam to said at least one chlorosilane is 5:1 to 100:1.

8. The process of claim 4, wherein, in the first stage, the mixture of said gas stream and said steam flows through a vertically oriented reaction tube which projects centrally from above a cooling jacketed cylindrical cooling container into the lower third of said cooling container in which said second stage takes place, and said cooling container is cooled with flowing water.

9. The process of claim 4, wherein said first stage is carried out in a tubular reactor which lies completely outside a cooling container, thereby forming a gas stream containing silica particles which is introduced tangentially into said cooling container.

10. The process of claim 8, wherein said cooling container is subdivided into two cooling zones.

11. The process of claim 9, wherein said cooling container is subdivided into two cooling zones.

12. The process of claim 2, wherein the total treatment time of said first and said second stages together is 3 to 300 sec.

13. The process of claim 1, wherein the temperature of said gas stream is up to 200° C.

14. The process of claim 1, wherein the temperature of said liquid, aqueous phase has a temperature of 10 to 90° C.

15. The process of claim 1, wherein the total treatment time of said first and said second stages together is 5 to 120 sec.

16. The process of claim 1, wherein the liquid, aqueous phase is selected from the group consisting of water and a basic aqueous liquid.

17. The process of claim 4, wherein in addition to said heterogeneous condensate of water or the aqueous phase of said heterogenous condensate of water, said gas stream is contacted with another aqueous liquid not produced by the condensation of said steam.

18. The process of claim 17, wherein said another aqueous liquid is selected from the group consisting of water and a basic aqueous liquid.

* * * * *